United States Patent [19]

Jarl et al.

[11] 4,267,741

[45] May 19, 1981

[54] VEHICLE GEARBOX

[75] Inventors: Stig Jarl, Mölnlycke; Per-Olof Eker, Gothenburg; Peter Davidsson, Mölnlycke, all of Sweden

[73] Assignee: AB Volvo, Gothenburg, Sweden

[21] Appl. No.: 27,091

[22] Filed: Apr. 4, 1979

[30] Foreign Application Priority Data

Apr. 11, 1978 [SE] Sweden .................................. 7804070

[51] Int. Cl.³ .......................... F16H 3/20; F16H 3/08; F16H 3/02
[52] U.S. Cl. ....................................... 74/339; 74/331; 74/360; 74/362
[58] Field of Search .................. 74/357, 358, 359, 360, 74/361, 362, 363, 374, 375, 335, 331, 339, 745, 701

[56] References Cited

U.S. PATENT DOCUMENTS

| | | | |
|---|---|---|---|
| 1,998,034 | 4/1935 | Vandervoort | 74/375 |
| 2,209,010 | 7/1940 | Wallis | 74/359 X |
| 2,316,503 | 4/1943 | Curtis | 74/359 X |
| 2,356,522 | 8/1944 | Kummich | 74/359 |
| 2,637,221 | 5/1953 | Backus | 74/745 |
| 3,318,167 | 5/1967 | Frost | 74/359 X |
| 3,859,870 | 1/1974 | Whateley | 74/339 |
| 4,106,358 | 8/1978 | Morrison | 74/359 X |
| 4,116,082 | 9/1978 | Kelbel | 74/359 X |

FOREIGN PATENT DOCUMENTS

| | | |
|---|---|---|
| 1500532 | 12/1965 | Fed. Rep. of Germany . |
| 2235368 | 7/1972 | Fed. Rep. of Germany . |
| 232772 | 5/1965 | U.S.S.R. ............................. 74/359 |

*Primary Examiner*—C. J. Husar
*Assistant Examiner*—Mark A. Daugherty
*Attorney, Agent, or Firm*—Young & Thompson

[57] ABSTRACT

A gearbox for motor vehicles having an input shaft with an input gear; a countershaft with a drive gear for the countershaft, said driving gear engaging the input gear; a transmission main shaft with a number of gears depending on the number of gear ratios, each of said gears being in driving engagement with an individual gear on the countershaft; a reverse shaft with a driving gear for said reverse shaft and engaging a gear on the countershaft; as well as a reverse gear engaging a gear on the main shaft. The gears on the main shaft and associated gears on the countershaft and reverse shaft can be selectively engaged to establish various driving connections between the input shaft and the transmission main shaft. At least one additional gear, disengagably journalled on the reverse shaft, engages a gear disengagably journalled on the countershaft. One of the other gears on the countershaft engages the main shaft gear which engages the reverse gear and is disengagably journalled on the countershaft.

4 Claims, 4 Drawing Figures

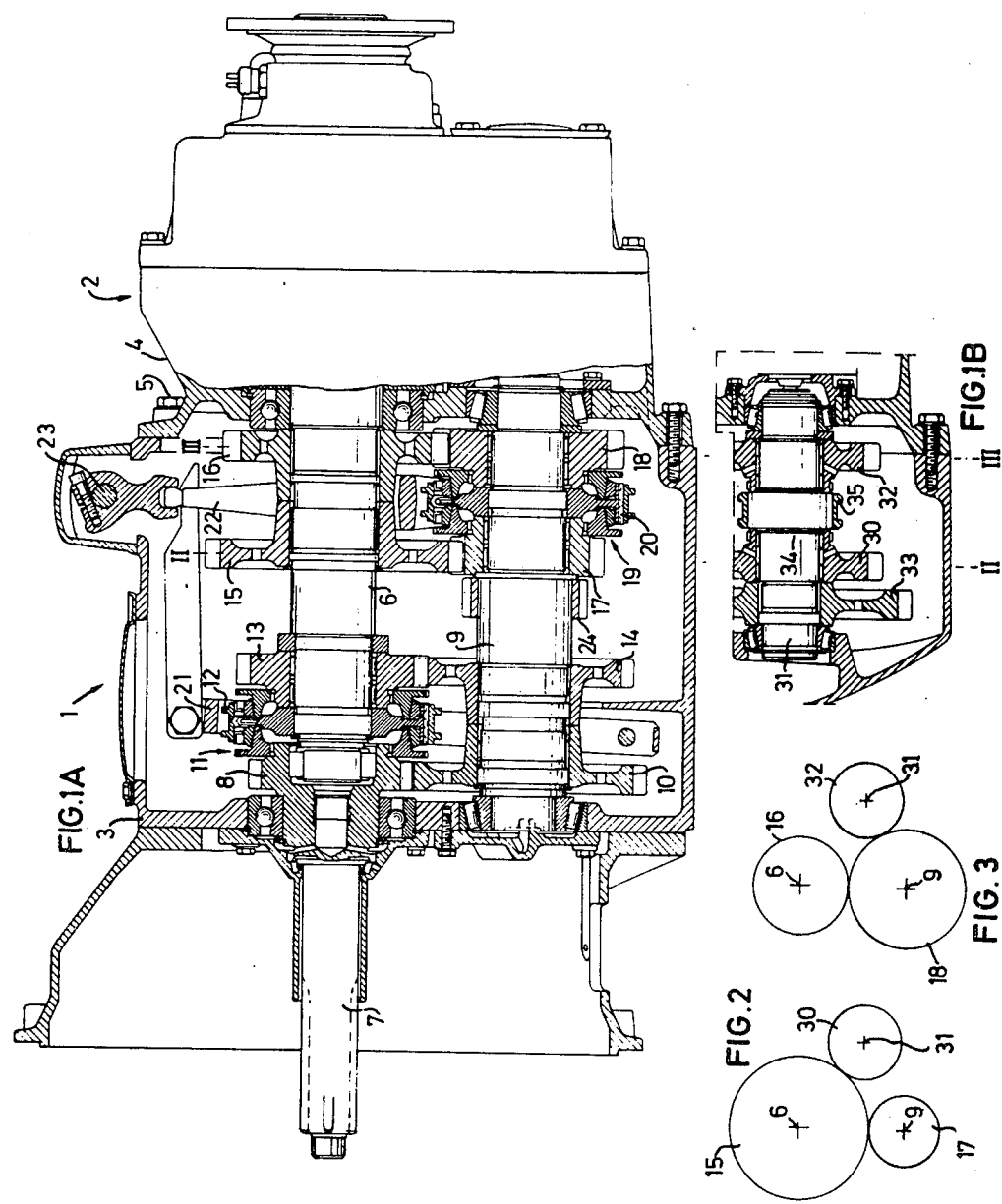

VEHICLE GEARBOX

The present invention relates to a gearbox for motor vehicles, comprising an input shaft with an input gear; a countershaft with a drive gear for the countershaft, said driving gear engaging the input gear; a transmission main shaft with a number of gears depending on the number of gear ratios, each of said gears being in driving engagement with an individual gear on the countershaft; and a reverse shaft with a driving gear for the reverse shaft, said driving gear engaging a gear on the countershaft, and a reverse gear engaging a gear on the main shaft, the gears on the main shaft and associated gears on the countershaft and reverse shaft being selectively engagable to establish various driving connections between the input shaft and the transmission main shaft.

In heavier goods vehicles such as transport trucks and the like, several gearboxes are generally used in combination to provide a large number of gear ratios, for example eight or sixteen speeds forward and two in reverse. These systems are usually based on a four-speed so-called basic gearbox of the type described in the introduction, which is provided with various attachment gearboxes. In this way, it is common to combine a four-speed basic gearbox with small gear ratio increments wih a two-speed attachment gearbox with a large gear ratio increment, a so-called range gearbox, which is coupled to the output shaft of the basic gearbox and is usually a planetary gear arrangement. Such a combined gearbox provides a low m.p.h. range and a high m.p.h. range. The first range provides the gears first through fourth because the r.p.m. of the output shaft is geared down in the range gearbox. The second range provides the gears fifth through eighth when the planetary gearing rotates as a unit, leaving the r.p.m. from the basic gearbox unchanged. To further increase the number of speeds, a so-called split gearbox can be arranged in front of the basic gearbox, which splits each gear into two gears making a total of 16 gears; or a basic gearbox with more than four gears can be used, especially if there is no need for as many as 16 speeds, since the gear ratio increments need not always be so small.

When expanding a basic gearbox of the type described in the introduction from, for example, four speeds forward to five speeds forward, the general practice is to place the gears in a row in the five-speed gearbox as well, thus increasing the total length of the gearbox. For large gear ratios, for example if the lowest gear is to be dimensioned to be a so-called creep gear, the distance between the shafts must be increased and gears with large diameters must be used to achieve reasonable tooth stresses. This makes it laborious to shift the gears in such a gearbox.

The purpose of the present invention is to achieve a gearbox of the type described in the introduction—especially intended for use as a basic gearbox together with a range gearbox—which has more than four speeds forward, especially with a so-called creep gear with a large gear ratio, without having to increase the total length in comparison to a corresponding four-speed box and without making it difficult to shift the gears.

This is achieved according to the invention by the reverse shaft having at least one additional gear which engages a gear disengagably journalled on the countershaft and which is disengagably journalled on the reverse shaft, and by one of the other gears on the countershaft engaging the main shaft gear which engages the reverse gear and being disengagably journalled on the countershaft.

By exploiting the reverse shaft in this manner for gears for speeds forward as well, which is made possible by arranging associated gears disengagable on the countershaft instead of on the main shaft in the conventional manner, a short total length of the gearbox is achieved. Furthermore, more speeds are obtained while using fewer gears than were required when all of the gears were in line. Finally, the synchronizing work is less, due to the fact that gears of large diameter are not necessary.

The invention will now be described in more detail with reference to an example shown in the accompanying drawing, in which:

FIG. 1A shows a vertical longitudinal section through an embodiment of a gearbox according to the invention, FIG. 1B shows a horizontal section through a portion of a gearbox according to the invention in the area of the reverse gear, and FIGS. 2 and 3 are schematic views in the planes II—II and III—III, respectively, in FIGS. 1A and 1B, on a reduced scale, illustrating the gear engagements between the gears of the reverse shaft and those of the countershaft and main shaft.

The gearbox shown comprises a basic gearbox 1 and a range box 2. The range box housing 4 is bolted securely to the basic gearbox housing 3 by means of bolts 5. The range gear mechanism 2 is of planetary type and has two speeds with a large gear ratio increment. It is in driving connection with the transmission main shaft 6 of the gearbox 1 in a manner known per se and not shown in more detail here. The basic design of the gearbox 1 is conventional, with an input shaft 7 carrying an input gear 8 which is non-rotatable relative to the same, and a countershaft 9 which non-rotatably carries a drive gear 10 in engagement with the gear 8. The end of the main shaft 6 carries in a conventional manner a synchronizing and coupling means 11 with an axially displacable sleeve 12 by means of which either a gear 13, freely rotatably journalled on the main shaft 6, can be locked to the shaft 6 or said main shaft 6 can be locked together with the input shaft 7, when the sleeve 12 is moved to the right or left, respectively, in FIG. 1A. The gear 13 engages a gear 14 which is non-rotatably fixed to the countershaft 9 and when engaged gives the next to the highest gear, i.e. third gear.

One of the special features of the invention is that the gears for first and second gear are formed of a pair of gears 15 and 16, respectively, which are non-rotatably joined to the main shaft 6, while the associated gears 17 and 18 on the countershaft 9 are freely rotatably journalled on the countershaft. The countershaft carries between the gears 17 and 18 a conventional synchronizing and coupling device 19 with an axially displacable sleeve 20, which when displaced to the left in FIG. 1A locks the gear 17 to the countershaft 9 to engage first gear, and when displaced to the right locks the gear 18 to the countershaft 9 for engaging second gear.

The engaging sleeve 12 for gear 13 and the engaging sleeve 20 for gears 18 and 17 is moved in a known manner by means of forks 21 and 22, respectively, by turning a shaft 23 which is connected to the regular shift lever of the gearbox.

The embodiment described thus provides first gear to fourth gear forward. Reverse is obtained with the aid of a reverse gear 30, which is rotatably journalled in a known manner on a reverse shaft 31 journalled in the housing 3 to one side of the main shaft 6 and the countershaft 9 (FIG. 1B). The reverse shaft 31 is enlarged in relation to a corresponding reverse shaft in a conventional four-speed gearbox and has an additional gear 32, which is rotatably journalled on the shaft. A non-rotatably fixed gear 24 on the countershaft 9 engages a gear 33 non-rotatably fixed on the reverse shaft 31 for driving the shaft 31. Between the gears 30 and 32 there is a dog clutch 34 with an axially displacable engaging sleeve 35. The sleeve is displacable with the aid of a conventional shift fork (not shown) to selectively lock one of the gears 30 or 32 to the shaft 31. Instead of a dog clutch 34, a sychronizing and coupling device of the same type as devices 11 and 19 on the main shaft and countershaft can be used between the gears 30 and 32.

The reverse gear 30 engages the gear 15 on the main shaft 6, while the gear 32 engages the gear 18 on the countershaft 9, as schematically illustrated in FIGS. 2 and 3. Consequently, when driving in first gear through fourth gear, the gears 30,32 must be released, so that they can rotate freely on the reverse shaft 31. When reverse is engaged, gears 13,17 and 18 are released by means of their synchronizing and coupling devices 11 and 19, and the reverse gear 30 is then locked onto the reverse shaft 31 by moving the dog clutch 34 sleeve 35 to the left in FIG. 1B. The driving from the input shaft 7 to the output shaft 6 now takes place via gears 8,10,24,33,30 and 15, whereby the main shaft 6 is driven in the opposite direction to the input shaft 7. If the dog clutch 34 sleeve 35 is moved to the right and is brought into engagement with the gear 32, gear 30 is released and gear 32 is locked onto the reverse shaft 31. The driving from the input shaft 7 to the output shaft 6 now takes place via gears 8,10,24,33,32,18 and 16, with the released gear 18 on the countershaft serving as an idler gear, so that the main shaft 6 is driven in the same direction as the input shaft 7, but with an appreciably reduced rotational speed. The creep gear has now been engaged. This gear has a greater ratio than the first gear.

In the embodiment according to the invention the gear 15 of the main shaft 6 is used both for first gear and for reverse, and the gear 16 of the main shaft is used for both second gear and the creep gear. In the embodiment shown in the drawing, the gear ratio with the lower range engaged is 15.15:1 for the creep gear, 9.15:1 for first gear and 6.62:1 for second gear. The step between first and the creep gear is thus significantly greater than between the other gears.

In the preceding, the range gearbox has not been treated in detail, since it is not part of the invention itself. It can have a construction and function which are known per se. In the above example, a range gearbox of planetary type was used with a gear ratio of 3.57:1 in the low range.

What we claim is:

1. Gearbox for motor vehicles comprising an input shaft with an input gear; a countershaft with a drive gear for the countershaft, said driving gear engaging the input gear; a transmission main shaft with a number of gears depending on the number of gear ratios, each of said gears being in driving engagement with an individual gear on the countershaft; a reverse shaft with a driving gear for the reverse shaft, said driving gear engaging a gear on the countershaft; and a reverse gear engaging a gear on the main shaft, the gears on the main shaft and associated gears on the countershaft and reverse shaft being selectively engagable to establish various driving connections between the input shaft and the transmission main shaft, characterized in that the reverse shaft has at least one additional gear disengagably journalled on the reverse shaft and which gear engages a gear disengagably journalled on the countershaft; and in that one of the other gears on the countershaft engages the main shaft gear which engages the reverse gear and is disengagably journalled on the countershaft.

2. Gearbox according to claim 1, characterized in that the gears which are disengagably journalled on the countershaft are freely rotatably journalled on the countershaft, while the associated gears on the transmission main shaft are non-rotatably joined to said main shaft; that the countershaft is provided, between said gears, with a synchronizing and coupling device with an axially displaceable sleeve which, when displaced in one direction, establishes a driving connection between the countershaft and one of said gears on the countershaft and in the opposite direction with the other of said gears on the countershaft; and in that the reverse shaft is provided, between the reverse gear and said additional gear, with a synchronizing and/or coupling device with an axially displaceable sleeve which, when displaced in one direction, establishes a connection between the reverse shaft and one of said gears on the reverse shaft and in the opposite direction with the other of said gears on the reverse shaft.

3. Gearbox according to claim 1 or 2, characterized in that said additional gear on the reverse shaft and said gears cooperating therewith on the countershaft and main shaft are selected so that the highest forward gear ratio of the gearbox is obtained when a driving connection is established via these gears.

4. Gearbox according to claim 2, characterized in that the main shaft has, in addition to the gears non-rotatably joined to the shaft, an additional gear which is disengagably disposed on the main shaft and which engages a gear which is non-rotatably joined to the countershaft, thereby making a total of five gear ratios forward.

* * * * *